US011944952B2

(12) United States Patent
Fang et al.

(10) Patent No.: US 11,944,952 B2
(45) Date of Patent: Apr. 2, 2024

(54) REMOVING CONTAMINANTS FROM WATER WITH ADSORBENTS

(71) Applicant: Fuel Tech, Inc., Warrenville, IL (US)

(72) Inventors: Mingming Fang, Naperville, IL (US); Heng Wang, Barrington, IL (US)

(73) Assignee: Fuel Tech, Inc., Warrenville, IL (US)

( * ) Notice: Subject to any disclaimer, the term of this patent is extended or adjusted under 35 U.S.C. 154(b) by 126 days.

(21) Appl. No.: 17/709,716

(22) Filed: Mar. 31, 2022

(65) Prior Publication Data

US 2022/0387966 A1 Dec. 8, 2022

Related U.S. Application Data

(60) Provisional application No. 63/194,284, filed on May 28, 2021.

(51) Int. Cl.
| | | |
|---|---|---|
| *B01J 20/20* | (2006.01) | |
| *B01J 20/08* | (2006.01) | |
| *B01J 20/10* | (2006.01) | |
| *B01J 20/12* | (2006.01) | |
| *B01J 20/14* | (2006.01) | |
| *B01J 20/28* | (2006.01) | |
| *C02F 1/28* | (2023.01) | |
| *C02F 101/10* | (2006.01) | |

(52) U.S. Cl.
CPC ............ *B01J 20/20* (2013.01); *B01J 20/08* (2013.01); *B01J 20/103* (2013.01); *B01J 20/12* (2013.01); *B01J 20/14* (2013.01); *B01J 20/28059* (2013.01); *C02F 1/288* (2013.01); *B01J 2220/42* (2013.01); *C02F 1/281* (2013.01); *C02F 2101/103* (2013.01); *C02F 2101/106* (2013.01)

(58) Field of Classification Search
None
See application file for complete search history.

(56) References Cited

U.S. PATENT DOCUMENTS

| | | | | |
|---|---|---|---|---|
| 4,888,314 | A | * 12/1989 | Bernier | .................. H01L 23/15 501/12 |
| 5,547,913 | A | * 8/1996 | Muramoto | ......... B01D 53/9481 502/328 |
| 5,603,838 | A | 2/1997 | Misra et al. | |
| 6,200,482 | B1 | 3/2001 | Winchester et al. | |
| 7,445,718 | B2 | 11/2008 | Misra et al. | |
| 7,476,311 | B2 | 1/2009 | Litz et al. | |

(Continued)

FOREIGN PATENT DOCUMENTS

| | | |
|---|---|---|
| AU | 199934293 | 10/1999 |
| WO | 2004/101142 | 11/2004 |
| WO | 2005/061391 | 7/2005 |

OTHER PUBLICATIONS

Preparation and Evaluation of GAC-based Iron-Containing Adsorbents for Arsenic Removal, Environ.Sci.Technol., 2005, 39, 3833-3843.

(Continued)

*Primary Examiner* — Chester T Barry
(74) *Attorney, Agent, or Firm* — OspreyIP, pllc; James R. Cartiglia

(57) ABSTRACT

A composition and process for reducing contaminants from water which includes use of a water-insoluble adsorbent having a surface area of at least about 10 $m^2/g$, where the adsorbent is coated with a water-soluble metal salt.

8 Claims, 1 Drawing Sheet

(56) References Cited

U.S. PATENT DOCUMENTS

| | | |
|---|---|---|
| 7,942,953 B2 | 5/2011 | Schlegel et al. |
| 8,361,920 B2 | 1/2013 | Dong |
| 10,526,215 B2 | 1/2020 | Sherwood et al. |
| 10,730,768 B2 | 8/2020 | Theodore |
| 11,345,614 B1 * | 5/2022 | Flood .................. B01J 20/3236 |
| 2006/0076270 A1 * | 4/2006 | Poshusta ................ C10G 25/12 |
| | | 208/299 |

OTHER PUBLICATIONS

Mechanisms of Selenate Adsorption on Iron Oxides and Hydroxides, Environ.Sci.Technol., 2002, 36, 1460-1466.

Removal of Arsenic by Bead Cellulose Loaded with Iron Oxyhydroxide from Groundwater, Environ.Sci.Technol., 2005, 39, 6808-6818.

Simultaneous Removal of Selenite and Selenate from Drinking Water Using Mesoporous Activated Alumina, Applied Water Science (2010) 10:10.

* cited by examiner

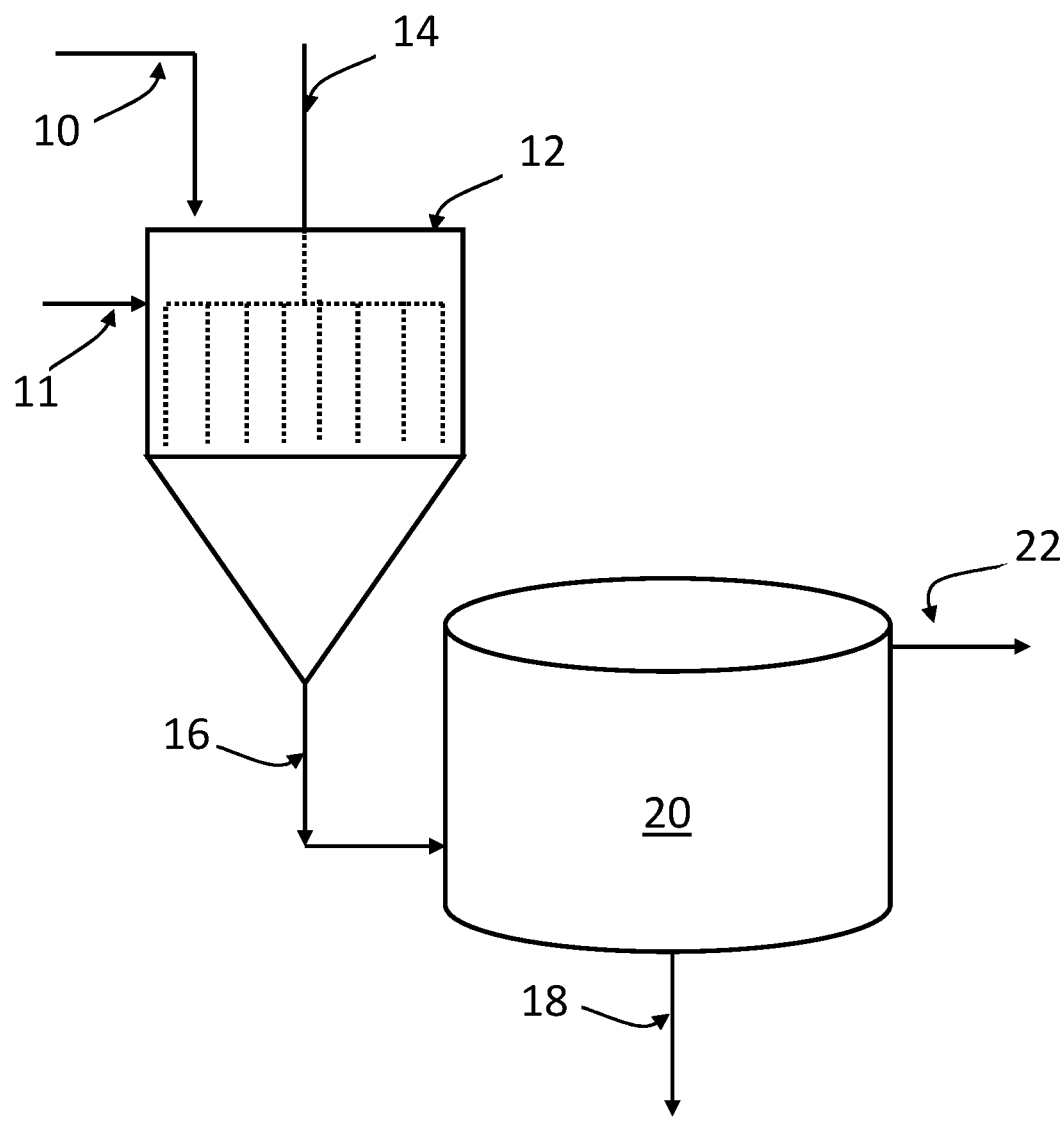

REMOVING CONTAMINANTS FROM WATER WITH ADSORBENTS

TECHNICAL FIELD

The present disclosure relates to reducing the level of contaminants such as arsenic and selenium from an aqueous stream using an adsorbent coated with a metal salt such as a ferric or aluminum salt. The coated adsorbent contacts a selenate- or arsenic-contaminated water in either a continuous adsorption tank system or a batch system with filtration system.

BACKGROUND

Wastewater treatment is becoming more and more important due to diminishing water resources, increasing wastewater disposal costs, and stricter discharge regulations that have lowered permissible contaminant levels in waste streams. The diversity of water pollutants calls for a wide range of treatment methods that are not only effective, but also technologically and economically feasible. The most common methods for the removal of contaminants from industrial effluents include biodegradation, precipitation, chemical oxidation, solvent extraction, evaporation, electrochemical approaches, membrane filtration, ion-exchange, and adsorption. Adsorption is—along with biodegradation—one of the two major treatments applied to the decontamination of water. From an industrial point of view, adsorption is technologically and economically feasible, while also being effective. While commonly used adsorbents in water treatment such as activated carbon, activated alumina, silica, and zeolites have their unique adsorption characteristics for different chemical species in water, better and more efficient adsorbents are continuously being sought for wastewater treatment.

Selenium is a micronutrient for living organisms, but is of concern due to the narrow range between its deficit and toxicity levels. The International Agency for Research on Cancer (IARC) classified selenium as a Group-3 carcinogen. Considering its adverse effects on human health, regulatory authorities such as the World Health Organization (WHO), the United States Environmental Protection Agency (U.S. EPA), Australia, Japan, India and Canada regulate its Maximum Contaminant Level (MCL) to a value of 50 μg $L^{-1}$.

Selenium (Se) exists in four valence (oxidation) states in nature. These four states are: (1) Selenate [Se(VI)], (2) Selenite [Se(IV)], (3) Elemental Selenium [Se(0)], and (4) Hydrogen Selenide [Se(-2)]. Among these four groups of selenium species, hydrogen selenide is a gas molecule, and elemental selenium is not water-soluble. Therefore, the main targets for selenium removal in water are selenate and selenite.

The aqueous chemistries of selenite and selenate are different. Se(VI) oxyanions in water include $H_2SeO_4$, $HSeO_4-$, and $SeO_4^{2-}$. Se(IV) oxyanions in water include $H_2SeO_3$, $HSeO_3-$, and $SeO_3^{2-}$. The actual Se(VI) and Se(IV) species depend on the pH of the water. At pH of 6 to 8, for example, the main Se(VI) species are mostly a combination of $HSeO_4-$ and $SeO_4^{2-}$, and the main Se(IV) species are mostly a combination of $HSeO_3-$ and $SeO_3^{2-}$.

In general, selenate [Se(VI)] is more soluble in water than selenite. Most of the metal selenite salts are insoluble in water except the alkali metal salts such as sodium selenite and potassium selenite. For example, calcium selenite [$CaSeO_3$] and magnesium selenite [$MgSeO_3$] are insoluble in water. Insoluble selenite compounds can be easily separated from water phase via filtration. Since calcium and magnesium cations are common components in wastewater, they can combine with selenite oxyanions to form calcium and magnesium selenite precipitate and that removes the selenite out of water phase.

On the other hand, most of the metal selenate salts are water soluble, including calcium selenate [$CaSeO_4$] and magnesium selenate [$MgSeO_4$]. Soluble selenate compounds are more challenging to remove in the wastewater treatment. Therefore, searching for adsorbents that can remove selenate from water efficiently is important. Studies have shown that selenate is more difficult to be adsorbed and removed from water than selenite. For example, alumina has been suggested by the U.S. EPA as one of the best available treatment technologies for removal of selenium from drinking water. Alumina shows very good adsorption efficiency for selenite, but it is not efficient for selenate, which is the dominant species in groundwater.

The art is in need of effective, economical methods to remove selenium, particularly selenate, from water.

Arsenic is also a concern in water because of its negative impacts on human health that range from lethality to chronic and carcinogenic effects. It is known that arsenic is a carcinogen and can cause acute arsenic poisoning, typically resulting in vomiting, abdominal pain, diarrhea, numbness and tingling of the extremities, muscle cramping and death. Long-term exposure to high levels of inorganic arsenic can cause skin pigmentation changes, skin lesions and hyperkeratosis. Other adverse health effects that may be associated with long-term ingestion of inorganic arsenic include developmental effects, diabetes, pulmonary disease, and cardiovascular disease.

One of the major sources of arsenic exposure by the general population is drinking water. To limit such exposure, the U.S. EPA has recently revised the maximum contaminant level (MCL) of arsenic in drinking water from 50 μg $L^{-1}$ to 10 μg $L^{-1}$.

Arsenic (As) exists in four valence (oxidation) states in nature. These four states are: (1) Arsenate [As(V)], (2) Arsenite [As(III)], (3) Elemental arsenic [As(0)], and (4) Arsine [As(-3)]. Among these four groups of arsenic species, arsine is a gas molecule and elemental arsenic is insoluble in water. The most prevalent forms commonly found in water are the inorganic arsenate and arsenite. The main target for arsenic removal from water, therefore, is to remove the arsenate and arsenite. As(III) oxyanions in water include $H_3AsO_3$, $H_2AsO_3-$, $HAsO_3^{2-}$, and $AsO_3^{3-}$. As(V) oxyanions in water include $H_3AsO_4$, $H_2AsO_4-$, $HAsO_4^{2-}$, and $AsO_4^{3-}$. The actual As(III) and As(V) species depend on the pH of the water. At pH of 6 to 8, the main As(III) species are mostly a combination of $H_2AsO_3-$ and $HAsO_3^{2-}$, and the main As(V) species are mostly a combination of $H_2AsO_4-$ and $HAsO_4^{2-}$.

Alkali-metal (Na, K, Cs) arsenates and arsenites are all water-soluble. Unlike the selenite and selenate, the solubility of alkaline-earth metal (Mg, Ca, Sr) arsenites and arsenates are similar: all slightly soluble in water. Therefore, both arsenates and arsenites are not easily made to form precipitates in water with Ca or Mg cations, and both require other methods to be removed from the water phase.

Adsorption has been shown to be an effective way to remove arsenic from water. The effectiveness of adsorption-based methods depends primarily on the adsorbent used. Several iron(III) oxides, such as hydrous ferric oxide, and goethite (α-FeOOH), are known for their ability to remove both As(V) and As(III) from aqueous solutions. Mechanisms for arsenic removal include adsorption onto the hydroxide surfaces, entrapment of adsorbed arsenic in the flocs, and formation of ferric arsenate ($FeAsO_4$) that is insoluble in water. Solid adsorbents used for arsenic adsorption also include activated alumina and activated carbon. However, alumina and activated carbon are found to be less effective than those different types of iron oxide/hydroxide for arsenic adsorption.

The art is in need of effective, economical methods to remove arsenite and arsenate from water.

BRIEF DESCRIPTION OF THE DRAWINGS

The disclosure will be better understood and its advantages more apparent when the following detailed description is read in conjunction with the accompanying drawings, in which:

FIG. 1 is a schematic diagram of one embodiment of the disclosure.

BRIEF SUMMARY

In an embodiment, the present disclosure includes a composition for reducing contaminants from water, the composition comprising a water-insoluble adsorbent having a surface area of at least about 10 m$^2$/g, where the adsorbent is coated with a water-soluble metal salt. The adsorbent can, in some embodiments, be selected from the group consisting of kaolin, alumina, silica, diatomaceous earth, and mixtures thereof.

The water-soluble salt is selected from the group consisting of ferric salts, aluminum salts, and mixtures thereof, such as ferric chloride, ferric nitrate, ferric sulfate, or mixtures thereof, and aluminum chloride, aluminum nitrate, aluminum sulfate, or mixtures thereof. The weight percent of metal salt coated on the adsorbent is, in some embodiments, between about 0.07% and about 20% by weight. In other embodiments, the weight percent of metal salt coated on the adsorbent is between about 0.1% and about 1.4% by weight.

In embodiments, the disclosure also includes a process for reducing contaminants including selenium and arsenic from contaminated water having a pH in the range of 2 to 12, the process including providing a water-insoluble adsorbent having a surface area of at least about 10 m$^2$/g, where the adsorbent is coated with a water-soluble metal salt; and contacting the adsorbent with the contaminated water. The water-soluble salt is selected from the group consisting of ferric salts, aluminum salts, and mixtures thereof, such as ferric chloride, ferric nitrate, ferric sulfate, or mixtures thereof, and aluminum chloride, aluminum nitrate, aluminum sulfate, or mixtures thereof. The weight percent of metal salt coated on the adsorbent is, in some embodiments, between about 0.07% and about 20% by weight. In other embodiments, the weight percent of metal salt coated on the adsorbent is between about 0.1% and about 1.4% by weight.

In some embodiments, the pH of the contaminated water is between 4 and 9, and the coated adsorbent is present in the contaminated water at a level of about 0.5 to about 20 g/liter, or even a level of about 0.5 to about 20 g/liter 2 to about 10 g/liter.

DETAILED DESCRIPTION

In the field of wastewater treatment, adsorption means the adherence or bonding of molecules (or ions) that are previously dissolved in the water phase onto the surface of a solid material that is insoluble in water. The material accumulated at the interface is the adsorbate and the solid surface is the adsorbent. Since adsorption is a surface phenomenon, any insoluble solid having a sufficiently large surface area may be an adsorbent. Other characteristics to be taken into account in choosing an adsorbent are based on criteria such as cost and availability, physical strength in solution (as to avoid disintegration), ability to be regenerated if required, etc.

Adsorbents can be simply classified as conventional and non-conventional adsorbents. The list of conventional commercial adsorbents includes activated carbons, ion-exchange resins (polymeric organic resins), and inorganic materials such as activated alumina, silica gel, zeolites and molecular sieves. Four types of generic adsorbents have dominated the commercial use of adsorption: activated carbons, silica gel, and activated alumina. Other adsorbents belong to the class of non-conventional adsorbents, like natural materials such as clays, industrial by-products such as red mud, and biosorbents such as chitosan and biomass.

In selecting an adsorbent for use in the process of the present disclosure, the adsorbent surface area should, in embodiments, be at least about 10 m$^2$/g. While there is no technical upper limit, in certain embodiments the surface area of the adsorbent is from about 10 m$^2$/g to about 1000 m$^2$/g. In yet other embodiments, the surface area of the adsorbent is at least about 40 m$^2$/g and, in some embodiments is about 40 m$^2$/g to about 700 m$^2$/g.

The adsorbent particles useful in the practice of the process of this disclosure can assume different shapes; for instance, in some embodiments the particles are spherical pellets, rods, or irregularly-shaped. In embodiments the diameter (or average diameter of non-spherical particles) can be between about 3 microns and about 5 mm; in other embodiments it is between about 10 microns and about 2 mm; in yet other embodiments the diameter (or average diameter) of the adsorbent particles is between about 250 microns (i.e., 0.25 mm) and about 1 mm.

The specific materials used as the adsorbent particles of the present disclosure can be conventional or non-conventional adsorbents. In some embodiments, however, the adsorbent particles are not zeolites or other highly crystalline synthetic materials. The cost of such materials makes them impractical and the internal channel diameter of highly crystalline synthetic materials like zeolites (i.e., often less than 10 angstroms) can, it is believed, lead to the channels being blocked by the metal salts when coated in accordance with this disclosure, thus reducing "available" surface area for adsorption of selenium or arsenic. In certain embodiments, the adsorbent particles are kaolin, acid activated clays, aluminum oxide ($Al_2O_3$), silicon dioxide ($SiO_2$), diatomaceous earth, and mixtures thereof.

The adsorbent selected is coated with a metal salt. In specific embodiments, the metal salt is a ferric salt, an aluminum salt, or mixtures thereof. Any water-soluble ferric salts or aluminum salts can be used. For example, in some embodiments the ferric salt can be any of ferric chloride, ferric nitrate, ferric sulfate, or other water-soluble ferric salts, or mixtures thereof. In some embodiments a suitable aluminum salt can be aluminum chloride, aluminum nitrate, aluminum sulfate, or any other water-soluble aluminum salts, or mixtures thereof. The weight percentage of metal salt coated on the adsorbent particles should, in some embodiments, be between about 0.07% and about 20% of the weight of the particles. In other embodiments, the weight percentage of metal salt coating on the adsorbent particles should, in some embodiments, be between 0.1% and about 1.4% of the weight of the particles; in yet another embodiment it should be between about 0.2% and about 0.75% of the weight of the adsorbent particles.

While the skilled artisan would recognize different processes for coating metal salts on the adsorbent particles, in one embodiment the process can generally involve the following steps:

(1) The desired amount of the selected metal salt is dissolved into water to make a solution. The coating method of this embodiment is generally referred to as the incipient wetness impregnation method that is widely used in producing heterogeneous catalysts in industries. The volume of the salt solution is enough to wet homogeneously all the solid (i.e., adsorbent particles) but not too much to cause a large liquid/solid phase separation.

(2) The wetted adsorbent is calcined in an oven or furnace at an elevated temperature. The temperature in such embodiments should be at least 50° C., or above 70° C., or, in some embodiments, above 100° C.

(3) In some embodiments, the dried adsorbent is ground to fine powder (if powder is the preferable physical form for the selected adsorbent or application method). If the physical form of the selected adsorbent is granular for a particular embodiment, then no grinding or further treatment is needed.

In an embodiment, in a process for treating contaminated water, such as selenate-containing or arsenic-containing water, the aforementioned metal salt-coated adsorbent is brought into contact with selenate-containing or arsenic-containing water so that the selenate or arsenic in the water is adsorbed by the adsorbent and thereby removed from the water phase. In an embodiment, the adsorbent is present at a level of about 0.5 to about 20 g/liter of contaminated water to be treated. In another embodiment, the adsorbent of the present disclosure is present at a level of about 1 to about 15 g/liter; in yet another embodiment, the adsorbent is present at a level of about 2 to about 10 g/liter.

There is no particular limit on the type of contaminated (such as selenate/arsenic-containing) water to which process of the present disclosure can be applied. The water can be from various sources such as coal-fired power plant wastewater, mining industry wastewater, natural underground water, or other industrial wastewater. In an embodiment, the contaminated water has a pH of between 2 and 12; in another embodiment the pH of the water is between 3 and 10. In still another embodiment the pH of the contaminated water treated in accordance with this disclosure is between 4 and 9.

One embodiment of a process of bringing the prepared adsorbent of the present disclosure into contact with contaminated water involves packing the disclosed adsorbent into a treatment tank (in some embodiments such tank is similar to conventional activated carbon adsorption tanks used to treat water or wastewater). In this embodiment, and as would be familiar to the skilled artisan, the treatment conditions include the packed amount of adsorbent, the flow volume, and the treatment temperature determined based on the adsorbent ability and the amount of contaminant such as selenate or arsenic in the water or wastewater (which can be measured, for instance, by Inductively Coupled Mass Spectrometry (ICP-MS), method EPA 200.8). The flow of water or wastewater can be either downward or upward. In some embodiments a downward flow is utilized because it facilitates recovery of the adsorbent by reversed washing (upward flow). For the disclosed metal salt coated adsorbents, however, recovery may not be necessary due to their low cost compared to conventional adsorbents such as activated carbon or zeolites. Therefore, more flexible engineering designs of the adsorption tanks are possible.

In another embodiment, a process for use of the metal salt-coated adsorbent of this disclosure is the batch method. Based on the contaminant concentration and the amount of water in the batch, a specific amount of adsorbent is determined as being desired (the determination of which would be known to the skilled artisan, as discussed above), and at least such amount is added into the batch under mixing conditions to form a slurry. The slurry is then discharged to a settling tank and the used adsorbent is filtered through a filtration system.

FIG. 1 is a schematic diagram of an embodiment of a batch system in accordance with the present disclosure, wherein an inlet 10 for water to be treated, and an inlet 11 for metal salt-coated adsorbent replenishment. The water to be treated is filled into reaction tank 12, will contain contaminants The reaction tank 12 is preferably stirred, such as by rotary rake 14 for a residence time in tank 12 of from about 1 to about 24 hours. The residence time will be selected by the initial concentration of the contaminant, a determination of the degree of contaminant reduction desired and the relative freshness of the adsorbent. Following a sufficient reaction time in reaction tank 12, the mixture of water and sorbent is drained via line 16 to a settling tank 20, from which purified water is extracted via line 22 and adsorbent is removed via line 18 for treatment or disposal.

The following examples are presented to further explain and illustrate the disclosure and are not to be taken as limiting in any regard. Unless otherwise indicated, all parts and percentages are by weight.

Example 1

As a control, the adsorption efficiency of several uncoated adsorbents for Se(VI), As(V), and As(III) is analyzed.

The Se(VI), As(V), and As(III) contaminated water solutions are prepared by dissolving sodium selenate ($Na_2SeO_4$), sodium arsenate ($Na_2HAsO_4 \cdot H_2O$), and sodium arsenite ($NaAsO_2$) in water, respectively. All the initial concentrations of Se(VI), As(V), and As(III) water solutions are about 1 ppm (the exact concentration was measured for each test) except where mentioned otherwise.

The adsorbents used are commercial products acquired or purchased from different US companies. All the adsorbents are in fine powder forms and were tested without any further treatment.

A typical adsorption test is described as the following: 50 mL of the pre-made 1 mg/L$^{-1}$ Se (VI) or As(V) or As(III) solution was added into a 125 mL Erlenmeyer flask. 0.5 g of a solid adsorbent was added into each solution. The adsorbent and the solution are agitated on an orbital shaker at 200 rpm for 30 min. After the adsorption, the mixture was centrifuged at 5,000 rpm for 30 min to separate the adsorbent from water. After the centrifugation, the solid sinks to the bottom. The water on the top is analyzed for the final concentration of Se(VI) or As(V) or As(III) and coated metal ions leached out in the solution based on EPA 200.8 method via Inductively Coupled Plasma Mass Spectroscopy (ICP-MS). The limit of detection for ICP-MS is 0.1 μg/L$^{-1}$ (0.1 ppb). A laboratory pH meter is used for pH measurements.

The effectiveness of an adsorbent that can remove (adsorb) Se and As oxyanions from water is quantitatively calculated by Removal Efficiency (RE). Removal Efficiency measures the percentage of Se or As removed from water after adsorption compared to the initial concentration under certain experimental conditions. At the same test conditions, higher RE indicates higher adsorption effectiveness of the adsorbent. The RE is calculated as:

$$RE = [(C_i - C_f)/C_i] \times 100\%$$

In equations above, $C_i$—initial concentration of Se or As or Fe/Al specie in mg/L$^{-1}$ in water before adding adsorbent $C_f$—final concentration of Se or As or Fe/Al specie in mg/L$^{-1}$ in water after adding adsorbent, mixing, and centrifuging Table 1 shows the results for Se(VI), As(V), and As(III) removal efficiency for five different solid adsorbents. All the adsorbents were tested under the same experimental conditions. The results indicate that without any coating, only activated carbon has a desirable removal efficiency for all three species [89.9% for Se(VI), 99.5% for As(V), and 98.8% for As(III)]. Activated alumina ($Al_2O_3$) has a desirable removal efficiency for As(V) (99.3%) and As(III) (90.8%), but does not perform well for Se(VI) (54.8%). Kaolin A shows good removal efficiency for As(V) (85.5%), but not very good removal efficiency for Se(VI) (46.1%) and poor removal efficiency for As(III) (8.1%). Both silica ($SiO_2$) and diatomaceous earth show poor adsorption for all three species.

TABLE 1

Adsorption Results of Different Selenium and Arsenic Species in Contaminated Water on Uncoated Adsorbents

| Adsorbent | % $Fe^{3+}/Al^{3+}$ Coated | Target Ion (Initial $C_0$ = 1 ppm) | Final Concentration $C_f$ (ppm) | Removal Efficiency (%) | Remain Fe/Al (ppm) |
|---|---|---|---|---|---|
| Kaolin A | 0 | Se(VI) | 0.5620 | 46.12 | N/A |
|  | 0 | As(V) | 0.1538 | 85.49 | N/A |
|  | 0 | As(III) | 0.7815 | 8.06 | N/A |
| Al2O3 | 0 | Se(VI) | 0.3880 | 54.83 | NA |
|  | 0 | As(V) | 0.0083 | 99.26 | NA |
|  | 0 | As(III) | 0.0669 | 90.75 | NA |
| SiO2 | 0 | Se(VI) | 0.8470 | 4.51 | N/A |
|  | 0 | As(V) | 0.9021 | 20.10 | N/A |
|  | 0 | As(III) | 0.9274 | 2.56 | N/A |
| Diatomaceous Earth (DE) | 0 | Se(VI) | 1.0900 | 0.00 | N/A |
|  | 0 | As(V) | 1.0845 | 0.00 | N/A |
|  | 0 | As(III) | 0.8234 | 3.13 | N/A |
| Powder Activated Carbon (PAC) | 0 | Se(VI) | 0.1050 | 89.93 | N/A |
|  | 0 | As(V) | 0.0056 | 99.47 | N/A |
|  | 0 | As(III) | 0.0103 | 98.79 | N/A |

Example 2

The process of Example 1 is then repeated using the same adsorbents, but in this case the adsorbents (other than powdered activated carbon) are coated with 0.5% ferric chloride. All test conditions are identical as those of Example 1 (listed in Table 1) except the modified preparation of the adsorbents according to the present disclosure. Powdered activated carbon (PAC) results from Table 1 are used as the benchmark.

Table 2 shows that the remaining four adsorbents coated with 0.5% ferric salt improve their removal efficiency for Se(VI), As(V), and As(III) dramatically. Kaolin A now has more than 99% removal efficiency for Se(VI), As(V), and As(III). Alumina and diatomaceous earth both have more than 98% removal efficiency for Se(VI), As(V), and As(III). Silica also shows more than 90% removal efficiency for Se(VI), As(V), and As(III).

TABLE 2

Adsorption Results of Different Selenium and Arsenic Species in Contaminated Water on Ferric-coated Adsorbents

| Adsorbent | % $Fe^{3+}$ Coated | Target Ion (Initial $C_0$ = 1 ppm) | Final Concentration $C_f$ (ppm) | Removal Efficiency (%) | Remain Fe (ppm) |
|---|---|---|---|---|---|
| Kaolin A | 0.5 | Se(VI) | <0.001 | >99.90 | 3.31 |
|  | 0.5 | As(V) | 0.0016 | 99.86 | 1.04 |
|  | 0.5 | As(III) | 0.0039 | 99.59 | 0.14 |
| Al2O3 | 0.5 | Se(VI) | <0.001 | >99.88 | 0.44 |
|  | 0.5 | As(V) | 0.0164 | 98.55 | 0.40 |
|  | 0.5 | As(III) | 0.0114 | 98.42 | 0.35 |
| SiO2 | 0.5 | Se(VI) | 0.0420 | 95.47 | 0.25 |
|  | 0.5 | As(V) | 0.0105 | 99.05 | 0.36 |
|  | 0.5 | As(III) | 0.0763 | 90.70 | 0.19 |
| Diatomaceous Earth (DE) | 0.5 | Se(VI) | 0.0180 | 98.24 | 0.85 |
|  | 0.5 | As(V) | 0.0016 | 99.86 | 0.33 |
|  | 0.5 | As(III) | 0.0030 | 99.64 | 0.72 |

Example 3

The process of Example 1 is then repeated using the same adsorbents, except the adsorbents (other than powdered activated carbon) are coated with 0.5% aluminum chloride. All test conditions are identical as those of Example 1 (listed in Table 1) except the coating of the adsorbents. PAC results from Table 1 again provide a benchmark.

Table 3 shows the remaining four adsorbents coated with 0.5% aluminum salt (aluminum chloride for these results) improve their removal efficiency for Se(VI), As(V), and As(III) dramatically. Kaolin A and silica both show more than 98.5% removal efficiency for Se(VI), As(V), and As(III). Alumina shows more than 95% removal efficiency for Se(VI), As(V), and As(III). Diatomaceous earth shows more than 96% removal efficiency for Se(VI), As(V), and As(III).

TABLE 3

Adsorption Results of Different Selenium and Arsenic Species in Contaminated Water on Aluminum-coated Adsorbents

| Adsorbent | % $Al^{3+}$ Coated | Target Ion (Initial $C_0$ = 1 ppm) | Final Concentration $C_f$ (ppm) | Removal Efficiency (%) | Remain Al (ppm) |
|---|---|---|---|---|---|
| Kaolin A | 0.5 | Se(VI) | <0.001 | >99.90 | 11.70 |
| | 0.5 | As(V) | 0.0125 | 98.89 | 13.1 |
| | 0.5 | As(III) | 0.0133 | 98.60 | 12.7 |
| Al2O3 | 0.5 | Se(VI) | 0.0290 | 96.80 | 5.58 |
| | 0.5 | As(V) | 0.0503 | 95.54 | 5.81 |
| | 0.5 | As(III) | 0.0386 | 95.60 | 5.87 |
| SiO2 | 0.5 | Se(VI) | 0.0110 | 98.79 | 6.40 |
| | 0.5 | As(V) | 0.0081 | 99.28 | 5.57 |
| | 0.5 | As(III) | 0.0085 | 99.11 | 5.41 |
| Diatomaceous Earth (DE) | 0.5 | Se(VI) | 0.0030 | 99.71 | 6.12 |
| | 0.5 | As(V) | <0.001 | >99.86 | 4.21 |
| | 0.5 | As(III) | 0.0367 | 96.14 | 6.59 |

All references cited in this specification, including without limitation, all patents, patent applications, and publications, and the like, are hereby incorporated by reference into this specification in their entireties. The discussion of the references herein is intended merely to summarize the assertions made by their authors and no admission is made that any reference constitutes prior art. Applicant reserves the right to challenge the accuracy and pertinence of the cited references.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. For example, while methods for the production of a commercially sterile liquid nutritional supplement made according to those methods have been exemplified, other uses are contemplated. Therefore, the spirit and scope of the appended claims should not be limited to the description of the versions contained therein.

What is claimed is:

1. A process for reducing contaminants including selenium and arsenic from contaminated water having a pH in the range of 2 to 12, comprising providing a water-insoluble adsorbent having a surface area of at least about 10 $m^2/g$, where the adsorbent is coated with a water-soluble metal salt; and contacting the adsorbent with the contaminated water.

2. The process of claim 1, wherein the water-soluble salt is selected from the group consisting of ferric salts, aluminum salts, and mixtures thereof.

3. The process of claim 2, wherein the water-soluble salt comprises ferric chloride, ferric nitrate, ferric sulfate, or mixtures thereof.

4. The process of claim 2, wherein the water-soluble salt comprises aluminum chloride, aluminum nitrate, aluminum sulfate, or mixtures thereof.

5. The process of claim 1, wherein the weight percent of metal salt coated on the adsorbent is between about 0.1% and about 1.4% by weight.

6. The process of claim 1, wherein the pH of the contaminated water is between 4 and 9.

7. The process of claim 1, wherein the coated adsorbent is present in the contaminated water at a level of about 0.5 to about 20 g/liter.

8. The process of claim 7, wherein the coated adsorbent is present in the contaminated water at a level of about 0.5 to about 20 g/liter 2 to about 10 g/liter.

* * * * *